United States Patent
Lehtovaara

(10) Patent No.: US 6,216,547 B1
(45) Date of Patent: Apr. 17, 2001

(54) LOAD SENSOR

(75) Inventor: Jorma J. Lehtovaara, Etobicoke (CA)

(73) Assignee: Litens Automotive Partnership, Woodridge (CA)

( * ) Notice: Subject to any disclaimer, the term of this patent is extended or adjusted under 35 U.S.C. 154(b) by 0 days.

(21) Appl. No.: 09/199,187

(22) Filed: Nov. 25, 1998

Related U.S. Application Data

(60) Provisional application No. 60/066,557, filed on Nov. 26, 1997.

(51) Int. Cl.[7] .................................. G01L 1/26; G01L 5/04
(52) U.S. Cl. .......................................................... 73/862.391
(58) Field of Search ......................... 73/862.621, 862.625, 73/862.627, 862.629, 862.632, 862.633, 862.634, 862.381, 862.391

(56) References Cited

U.S. PATENT DOCUMENTS

| | | |
|---|---|---|
| 3,186,220 | 6/1965 | Flinth . |
| 3,611,822 | 10/1971 | Sanderson . |
| 3,824,846 | 7/1974 | Anderson . |
| 4,024,755 | 5/1977 | Quehen . |
| 4,581,947 | 4/1986 | Wulf et al. . |

FOREIGN PATENT DOCUMENTS

| | | |
|---|---|---|
| 604 147 | 8/1978 | (CH) . |
| 24 09 372 | 9/1975 | (DE) . |
| 27 33 569 | 2/1979 | (DE) . |
| 336727 | 5/1985 | (DE) . |
| 3603187 | 8/1987 | (DE) . |
| 4313862 | 7/1994 | (DE) . |
| 19511110 | 9/1996 | (DE) . |
| 1081907 | 9/1967 | (GB) . |
| 421894 | 11/1974 | (SU) . |

*Primary Examiner*—William Oen
(74) *Attorney, Agent, or Firm*—Pillsbury Winthrop LLP

(57) ABSTRACT

The present invention relates to a load sensor comprises an annular gauge ring comprising an annular inner ring portion and an annular outer ring portion. The gauge ring has strainable beam members and flexing beam members. The beam members interconnect the ring portions. The flexing beam members are thicker in comparison to the strainable beam members so that the flexible beam members are less subject to elongation and compression due to strain in comparison to the strainable beam members such that the flexing beam members substantially limit the relative movement between the ring portions to the load measuring direction when a load with a force component in the load measuring direction is applied to one of the ring portions by (1) resisting elongation and compression to substantially prevent relative movement between the ring portions in a transverse direction and (2) flexing to allow limited relative movement between the ring portions in the load measuring direction. The strainable beam members are constructed and arranged such that the substantially isolated relative movement between the ring portions creates a strain in the load measuring direction in the strainable beam members. The strain has a magnitude directly related to a magnitude of the force component in the load measuring direction. A strain measuring an outputting device is adapted to measure the magnitude of the strain and to thereafter output the measured strain magnitude as an output signal which can be used to calculate the force component magnitude and hence the applied load. The load sensor of the present invention may be used in a variety of applications. The load sensor is particularly well suited for measuring belt tension in both idler and torque transmitting pulley assemblies. Also, the load sensor may be used to measure the co-efficient of friction between a bushing and an oscillating shaft.

24 Claims, 15 Drawing Sheets

LOAD SENSOR

This application claims benefit of Provisional 60/066/557 Nov. 26, 1997.

The present invention relates to a load sensor and, in particular, to a load sensor for measuring belt tension in dynamic systems such as an idler or torque transmitting pulley.

In vehicle engines which have a number of belt driven components, proper belt tension is important to reducing belt noise, increasing belt life, and enhancing performance. If the belt is too tense, the belt's effective life will be reduced and increased belt noises will occur during vehicle operation. If the belt is too slack, slippage between the belt and its associated pulleys may occur, thereby causing a deleterious effect on engine performance.

A number of devices are known for measuring belt tension. Three-point tension measurement devices are crude devices which are not often used because of two major drawbacks. First, the device is bulky and cannot be used with tight belt drives, such as timing belt drives in automotive engines. Second, the device considerably changes the dynamic behavior of the belt system, and therefore does not provide accurate measurements.

Static and dynamic belt span vibratory frequency measurement devices, such as clavis gauges or laser probes, measure the frequency of a laterally vibrating belt. The measurement can thereafter be used to calculate the actual belt tension, providing the mass of the belt and the span end pivot conditions are known. Because these conditions are not always constant, this method is not always accurate. These inaccuracy problems increase when measuring the frequency of a running belt, especially during mixed mode belt vibrations. Furthermore, measuring the frequency of a running belt only reveals the average dynamic tension, not the highs and lows of the belt tension.

Belt tension can also be measured using tension-sensitive coatings on the belt. This method, however, is highly sensitive to other belt stresses (e.g., belt twisting) in addition to pure tension. Also, this method is cumbersome, expensive, and unreliable in environmentally demanding conditions such as automotive engines.

Torque sensors on driven and driving pulleys or sprockets are commercially available devices that measure belt tension with relatively high accuracy. These sensors, however, can seldom be used due to space limitations, especially on timing belt drives. Furthermore, their high inertia makes them unacceptable for measuring dynamic system behavior.

Custom-made strain gauged drive components may also be used to measure belt tension, but these are time consuming and expensive to manufacture because of their customized nature. In addition, these devices are generally inaccurate due to lack of thermal compensating. Furthermore, in most cases, the strain gauged section of the device is relatively far from the belt/pulley interface, introducing errors, especially those caused by inertia in high frequency measurement conditions. This usually results in the device itself vibrating, which can be witnessed as negative force readings, noise, and high hysteresis value readings. Finally, these types of devices are highly sensitive to belt mistracking, i.e., belt centerline variation.

It is therefore an object of the present invention to provide a pulley assembly in which dynamic belt tension can be accurately measuring without affecting the dynamic behavior of the driven system. In order to achieve this object, the present invention provides a pulley assembly for measuring driving element tension in a system driven by a tensioned endless driving element. The pulley assembly comprises a rotatable pulley member having a driving element engaging outer surface engageable with the tensioned driving element such that the driving element applies a load to the pulley member directly related to the driving element tension. The load has a force component in a load measuring direction. The pulley member is mounted to a shaft assembly also comprises a load sensor which in turn comprises an annular gauge ring comprising an annular inner ring portion and an annular outer ring portion. The gauge ring is operatively associated with one of the pulley member and the shaft such that the load applied to the pulley member causes relative movement between the ring portions. The ring has strainable beam members extending in the load measuring direction and flexing beam members extending in a transverse direction generally perpendicular to the load measuring direction. The strainable beam members and the flexing beam members interconnect the ring portions.

The flexing beam members are thicker in comparison to the strainable beam members so that the flexing beam members are less subject to elongation and compression due to strain in comparison to the strainable beam members such that the flexing beam members substantially limit the relative movement between the ring portions to the load measuring direction when the load is applied to the pulley member by (1) resisting elongation to substantially prevent relative movement between the ring portions in the transverse direction and (2) flexing to allow limited relative movement between the ring portions in the load measuring direction. The strainable beam members are constructed and arranged such that the limited relative movement between the ring portions creates a strain in the load measuring direction in the strainable beam members. The strain has a magnitude directly related to a magnitude of the force component in the load measuring direction. The load sensor also comprises a strain measuring and outputting device operable to measure the magnitude of the strain and to thereafter output the measured strain magnitude as an output signal which can be used to calculate the force component magnitude and hence the driving element tension.

The pulley assembly of the present invention has a number of advantages over tension measuring devices known heretofore. Most importantly, the use of the load sensor in the pulley assembly of the present invention does not significantly affect the dynamic behavior of the driven system. Therefore, it is possible to obtain accurate readings of the belt tension as they would be found in practical applications. In addition, because the strainable beam members are relatively thin they are sensitive to the applied load and the resulting measurements are not affected by any transverse loading components because of the relative thickness of the transverse flexing beam members. Furthermore, the load sensor in the pulley assembly of the present invention can be arranged in close proximity to the belt/pulley interface such that slight variations in belt tension can be sensed by the measuring and outputting device. Thus, the load sensor of the present invention provides enhanced sensitivity to dynamic load changes.

The pulley assembly of the present invention can take a variety of forms. As will be seen from the following detailed description and the accompanying drawings, the gauge ring may be fixedly mounted to a fixed shaft with the pulley member rotatably mounted to the outside of the gauge ring, preferably by a ball bearing assembly. Additionally, the shaft may be rotatable and the gauge ring may be fixedly mounted to the shaft with the pulley member fixedly mounted to the gauge ring such that all three components rotate together. This arrangement can be particularly useful not only in an idler pulley assembly but also in a torque transmitting pulley assembly.

In its broadest aspects, the present invention is concerned with the load sensor itself out of the pulley assembly environment. The load sensor of the present invention comprises an annular gauge ring comprising an annular inner ring portion and an annular outer ring portion. The gauge ring has strainable beam members and flexing beam members. The beam members interconnect the ring portions. The flexing beam members are thicker in comparison to the strainable beam members so that the flexible beam members are less subject to elongation and compression due to strain in comparison to the strainable beam members such that the flexing beam members substantially limit the relative movement between the ring portions to the load measuring direction when a load with a force component in the load measuring direction is applied to one of the ring portions by (1) resisting elongation and compression to substantially prevent relative movement between the ring portions in a transverse direction and (2) flexing to allow limited relative movement between the ring portions in the load measuring direction. The strainable beam members are constructed and arranged such that the substantially isolated relative movement between the ring portions creates a strain in the load measuring direction in the strainable beam members. The strain has a magnitude directly related to a magnitude of the force component in the load measuring direction. A strain measuring an outputting device is adapted to measure the magnitude of the strain and to thereafter output the measured strain magnitude as an output signal which can be used to calculate the force component magnitude and hence the applied load.

The load sensor itself can be used in a variety of applications. As can be appreciated from the above discussion and the following detailed description, the load sensor of the present invention has many commercially advantageous applications for measuring belt tension in systems driven by an endless belt. The load sensor of the present invention may also be used to measure friction between an oscillating shaft and a bushing as disclosed hereinbelow. It is to be understood that the load sensor of the present invention may be applied to a wide variety of measuring applications and not only to those specifically disclosed in the present application.

Other objects, features, and advantages of the present invention will become apparent from the following detailed description, the accompanying drawings, and the appended claims.

DETAILED DESCRIPTION OF THE PREFERRED EMBODIMENT OF THE INVENTION

Figure 1:
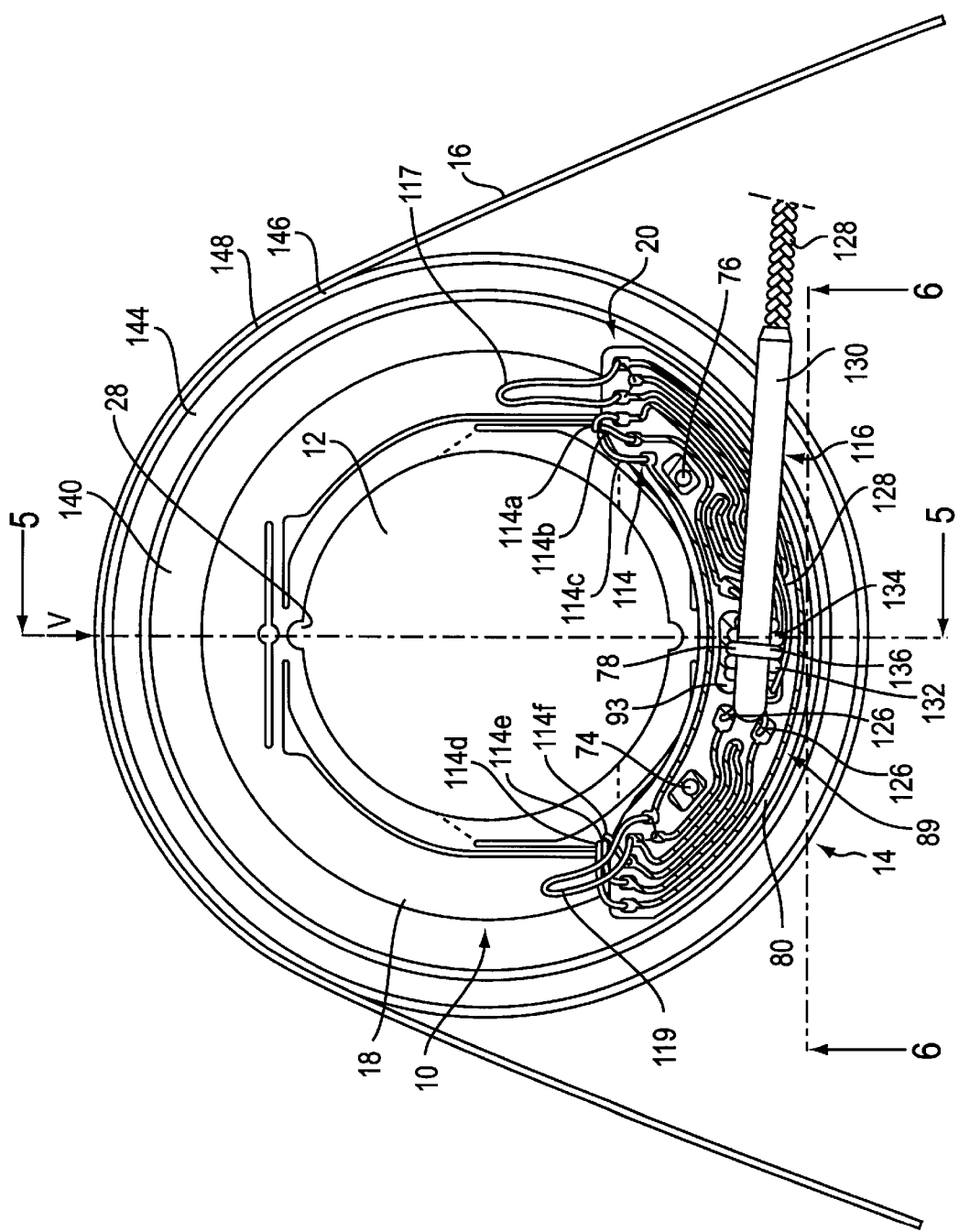
FIG. 1 is a front plan view illustrating a hub load sensor embodying the principles of the present invention being utilized in conjunction with an idler pulley assembly to measure belt load force.

FIG. 1 illustrates a hub load sensor, generally indicated at 10, fixedly mounted on a non-rotatable shaft 12 and being utilized in conjunction with an idler pulley assembly 14 to measure the belt load applied by a belt 16 operatively associated with the idler pulley assembly 14. The tension in the belt 16 applies a force in a load measuring direction indicated by arrow V on the idler pulley assembly 14. As will be seen from the following description, the hub load sensor 10 is designed to measure forces in the load measuring direction shown in FIG. 1 as vertical. It is not necessary to orient the hub load sensor in a vertical direction to accomplish the objects of the present invention. By measuring forces in the load measuring direction, the hub load sensor 10 can be utilized to determine the tension in belt 16.

Figure 2:
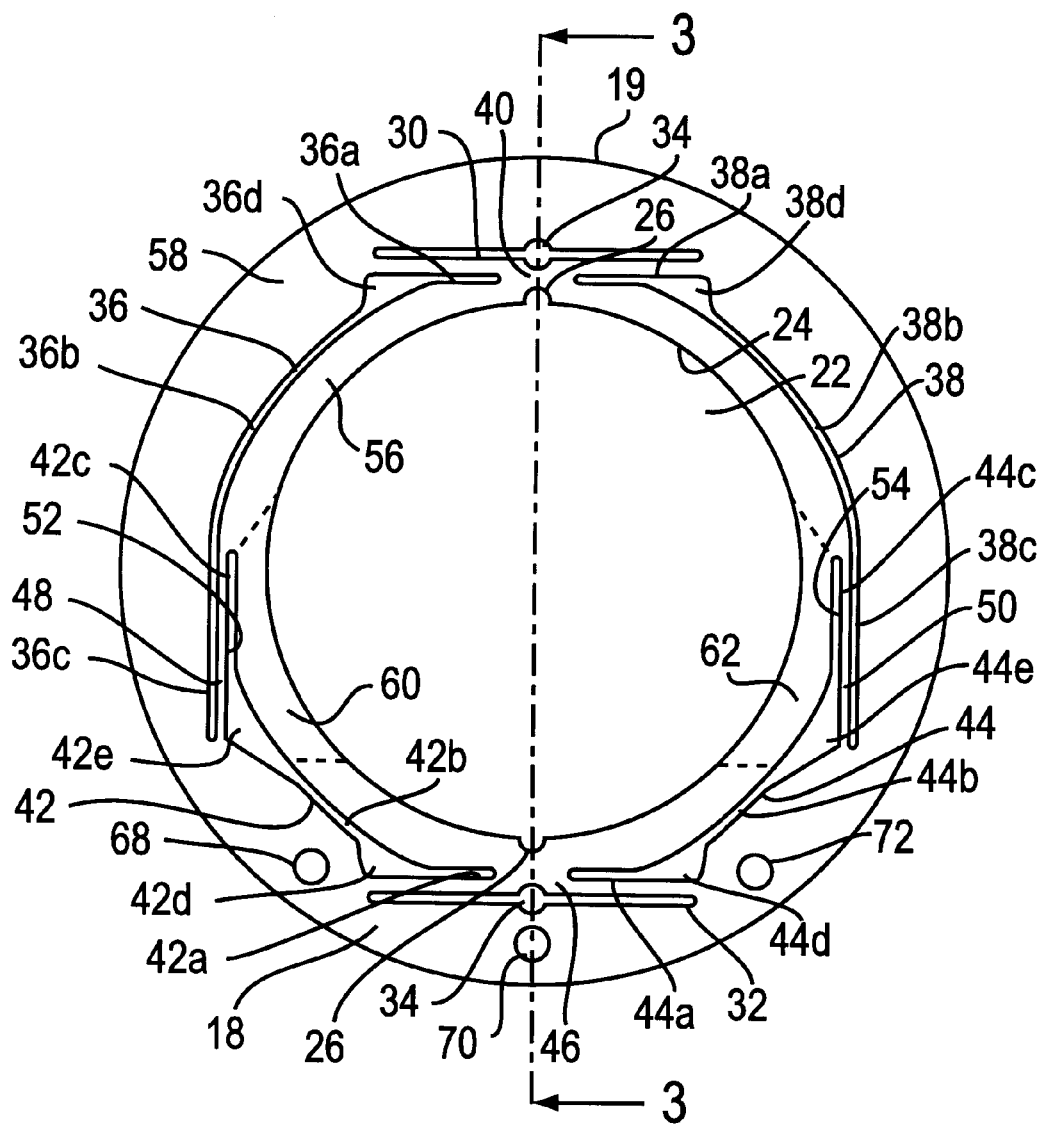
FIG. 2 illustrates a gauge ring used in the hub load sensor of the present invention.
Figure 3:
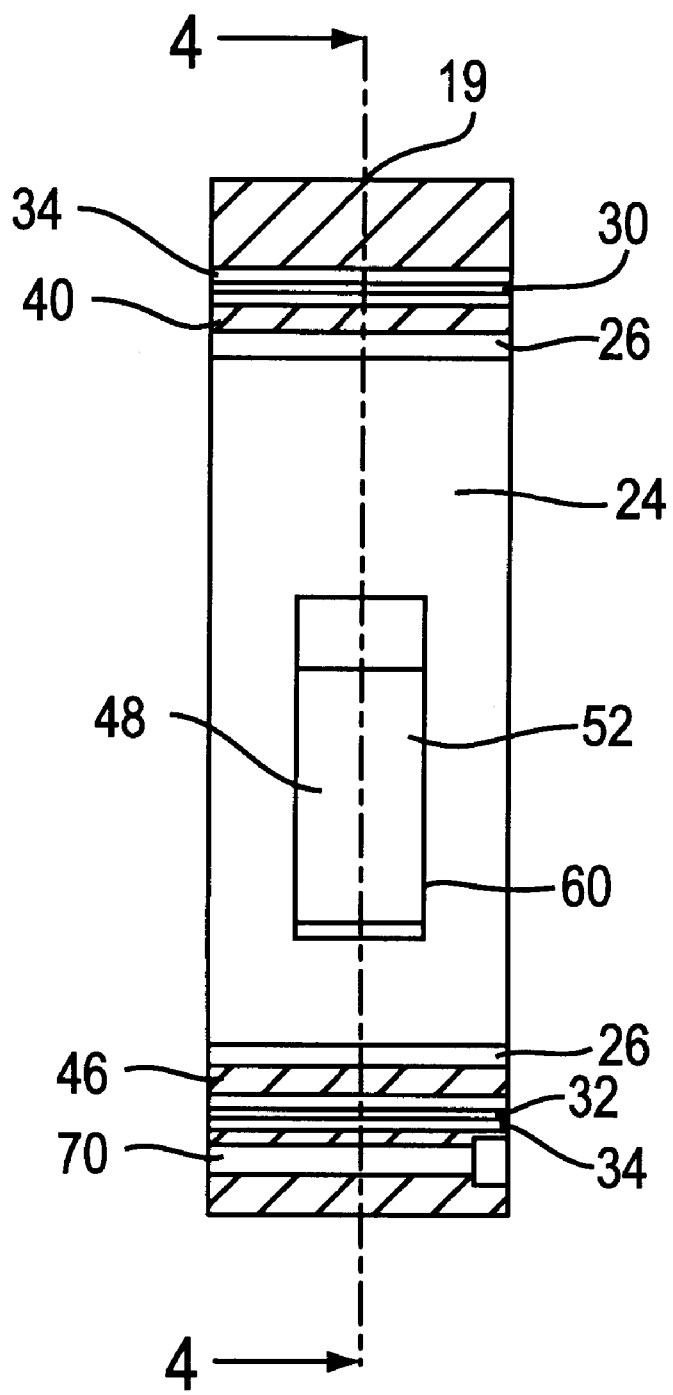
FIG. 3 is a sectional view of the gauge ring along line 3—3 of FIG. 2.
Figure 4:
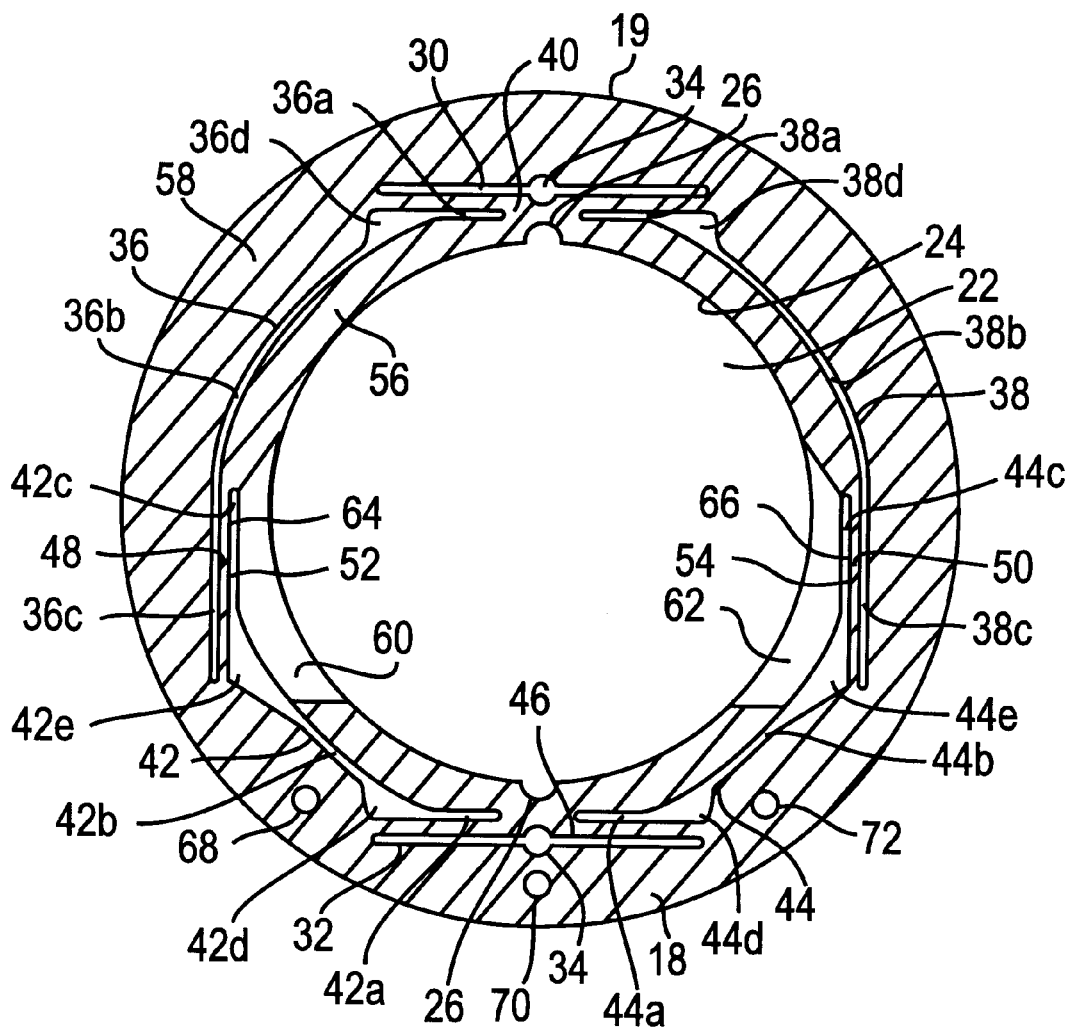
FIG. 4 is a sectional view of the gauge ring along line 4—4 of FIG. 3.

The hub load sensor 10 comprises two general components: a gauge ring 18 and a strain measuring and outputting device in the form of a strain gauge circuitry assembly 20. The gauge ring 18 is made of hardened steel and has a generally cylindrical exterior shape. Referring to FIGS. 2, 3, and 4, a cylindrical bore 22 concentric with the axis of rotation for the pulley assembly 14 extends through the gauge ring 18 and defines an interior surface 24 of the gauge ring 18 for receiving a stationary shaft such as, for example, shaft 12 of the pulley assembly 14. Two semicircular concave indentations or grooves 26 are defined on the interior surface 24 of the gauge ring 18 opposite one another and extend through the gauge ring 18 parallel to the axis of pulley rotation. The semicircular grooves 26 are designed to engage semicircular projections on a shaft, such as those indicated at 28 on shaft 12 in FIG. 1, thereby fixedly mounting the hub load sensor 10 on the shaft and preventing rotation of the ring 18 during dynamic conditions as will be described.

The gauge ring 18 has an upper flat cavity 30 and a lower flat cavity 32 disposed on opposite sides of the gauge ring 18. The flat cavities 30,32 extend through the gauge ring 18 in a direction parallel to the axis of pulley rotation. Also, the flat cavities 30,32 have a width in a transverse direction perpendicular to the load measuring direction. The width of each flat cavity 30,32 is significantly greater than the height and extends symmetrically with respect to the load measuring direction. Each flat cavity 30,32 is created by the wire electronic discharge machining method (wire EDM). In the wire EDM method, the gauge ring 18 is immersed in non-conductive liquid, such as oil, and an electrically charged wire is used to cut through the ring 18. This method is particularly useful for cutting through hardened steel. Holes 34 are formed axially through the gauge ring 18 prior to the wire EDM process, either by drilling or by conventional EDM method, to allow the charged wires to be fed through the hardened steel gauge ring 18 to create the flat cavities 30,32.

The gauge ring 18 also has two upper arcuate cavities 36,38 extending axially through the gauge ring 18 parallel to the axis of pulley rotation. The upper arcuate cavities 36,38 are disposed symmetrically in the gauge ring 18 with respect to a bisecting line which extends in the load measuring direction and divides the gauge ring 18 into semi-cylindrical portions. Each upper arcuate cavity 36, 38 has an upper flat portion 36a,38a, an arcuate portion 36b,38b, and a lower flat portion 36c,38c. Each upper flat portion 36a, 38a is disposed parallel to and spaced generally radially inwardly from the upper flat cavity 30. The region of the gauge ring 18 between the upper flat cavity 30 and upper flat portions 36a,38a of the upper arcuate cavities 36,38 defines a pair of transversely extending upper flexing beam members 40a and 40b which have a generally rectangular plate configuration and will be discussed in detail below.

Each arcuate portion 36b,38b is formed in the shape of an arc generally concentric to the axis of pulley rotation and extends generally downward from the upper flat portions 36a,38a to or close to an imaginary transversely extending bisecting line which is perpendicular to the aforementioned imaginary bisecting line extending in the load measuring direction and also divides the gauge ring 18 into two semi-cylindrical portions. The lower flat portions 36c,38c extend downward from the arcuate portions 36b,38b in the load measuring direction. The flat portions 36c,38c extend lengthwise in the load measuring direction generally parallel to one another and perpendicular to flat portions 36a,38a. The upper arcuate cavities 36,38 also have generally triangular cavity portions 36d,38d at the juncture of the arcuate portions 36b,38b and the upper flat cavities 36a,38a. Like the upper and lower flat cavities 30,32, the upper arcuate cavities 36,38 are also created by a combination of predrilled holes through the triangular cavity portions 36d, 38d and wire EDM.

Additionally, the gauge ring 18 also has two lower arcuate cavities 42,44 extending axially through the gauge ring 18 parallel to the axis of pulley rotation. The lower arcuate cavities 42,44 are disposed symmetrically in the gauge ring 18 with respect to the aforementioned imaginary bisecting line extending in the load measuring direction. Each lower arcuate cavity has a lower flat region 42a,44a, an arcuate region 42b,44b generally concentric with respect to the axis of pulley rotation, and an upper flat region 42c,44c. Each lower flat region 42a,44a is disposed parallel to and spaced generally radially inwardly from the lower flat cavity 32. The region of the gauge ring 18 between the lower flat cavity 32 and the lower flat regions 42a,44a of the lower arcuate cavities 42,44 defines a pair of transversely extending lower flexing beam members 46a and 46b which have a generally rectangular plate configuration and will be discussed in detail below.

Each arcuate region 42b,44b is formed in the shape of an arc generally concentric with the axis of rotation and extending upward from the lower flat regions 42a,44a. The upper flat regions 42c,44c extend upward from the arcuate regions 42b,44b in the load measuring direction and are disposed parallel to and spaced generally radially inwardly from the lower flat portions 36c,38c of the upper arcuate cavities 36,38. Two generally triangular regions 42e,44e are formed at the juncture of the upper flat regions 42c,44c and the arcuate regions 42b,44b.

Generally inwardly facing interior surfaces of the upper flat regions 42c,44c and generally inwardly facing interior surfaces of the generally triangular regions 42e,44e are formed continuously to define strain gauge mounting surfaces 52,54. The strain gauge mounting surfaces 52,54 extend in the load measuring direction parallel one another. The regions of the gauge ring 18 between the strain gauge mounting surfaces 52,54 and the lower flat cavities 36c,38c define plate-like strainable beam members 48,50.

The lower arcuate cavities 42,44 also have generally triangular cavities 42d,44d at the juncture of the arcuate regions 42b,44b and the lower flat regions 42a,44a. Like the upper and lower flat cavities 30,32 and the upper arcuate cavities 36,38, the lower arcuate cavities 42,44 are also created by the wire EDM method as discussed above.

Together the upper and lower arcuate cavities 36,38,42,44 divide the gauge ring 18 into an inner gauge ring portion 56 and an outer gauge ring portion 58. Reliefs 60,62 are cut out of the inner gauge ring portion 56 and expose the strain gauge mounting surfaces 52,54 such that these surfaces 52,54 communicate with the cylindrical bore 22. The inner gauge ring portion 56 and the outer gauge ring portion 58 are integrally connected only by the plate-like transversely extending upper and lower flexing beam members 40a,40b, 46a, 46b and the plate-like strainable beam members 48,50 extending in the load measuring direction.

The plate-like configuration of the upper and lower flexing beam members 40a,40b,46a,46b allow these members to be flexible in the load measuring direction and very stiff in the transverse direction. Application of a load in the load measuring direction to the exterior of the gauge ring creates slight relative movement between the outer gauge ring portion 58 and the inner gauge ring portion 56, which is fixedly mounted to the stationary shaft 12. Application of a load having force components in both the load measuring and transverse directions will move the ring portion 58 in accordance with the load measuring and transverse force components. The flexibility of the upper and lower flexing beam members 40a, 40b,46a, 46b in the load measuring direction allows the outer gauge ring portion 58 to move in the load measuring direction with respect to the inner gauge ring portion 56. The stiffness in the transverse direction of the upper and lower flexing beam members 40a,40b,46a, 46b, however, minimizes and substantially prevents movement of the outer gauge ring portion 58 in the transverse direction with respect to the inner gauge ring portion 56.

The plate-like strain members 48,50 are long and relatively thin and extend in the load measuring direction connecting the outer gauge ring portion 58 to the inner gauge ring portion 56. These strain members 48,50 are subject to very low bending stresses in the transverse direction due to the stiffness of the flexing beam members 40a,40b,46a,46b in the transverse direction. The relative movement permitted by the upper and lower flexing beam members 40a, 40b,46a, 46b of the outer gauge ring portion 58 with respect to the inner gauge ring portion 56 creates strain in the strain members 48,50 in the load measuring direction. By permitting relative movement of the outer gauge ring portion 58 with respect to the stationary inner gauge ring portion 56 and minimizing transverse relative movement of the outer gauge ring portion 58, relative movement is substantially isolated to the load measuring direction and produces strain in the strainable beam members 48,50 in the load measuring direction only. Strain gauges 106,110 oriented in the load measuring direction and strain gauges 108,112 oriented in the axial direction of the strain gauge circuitry assembly 20, which will be discussed in detail below, are mounted on the exposed regions 64,66 of the strain gauge mounting surfaces 52,54 to measure the strain in the strainable beam members 48,50.

Figure 7:
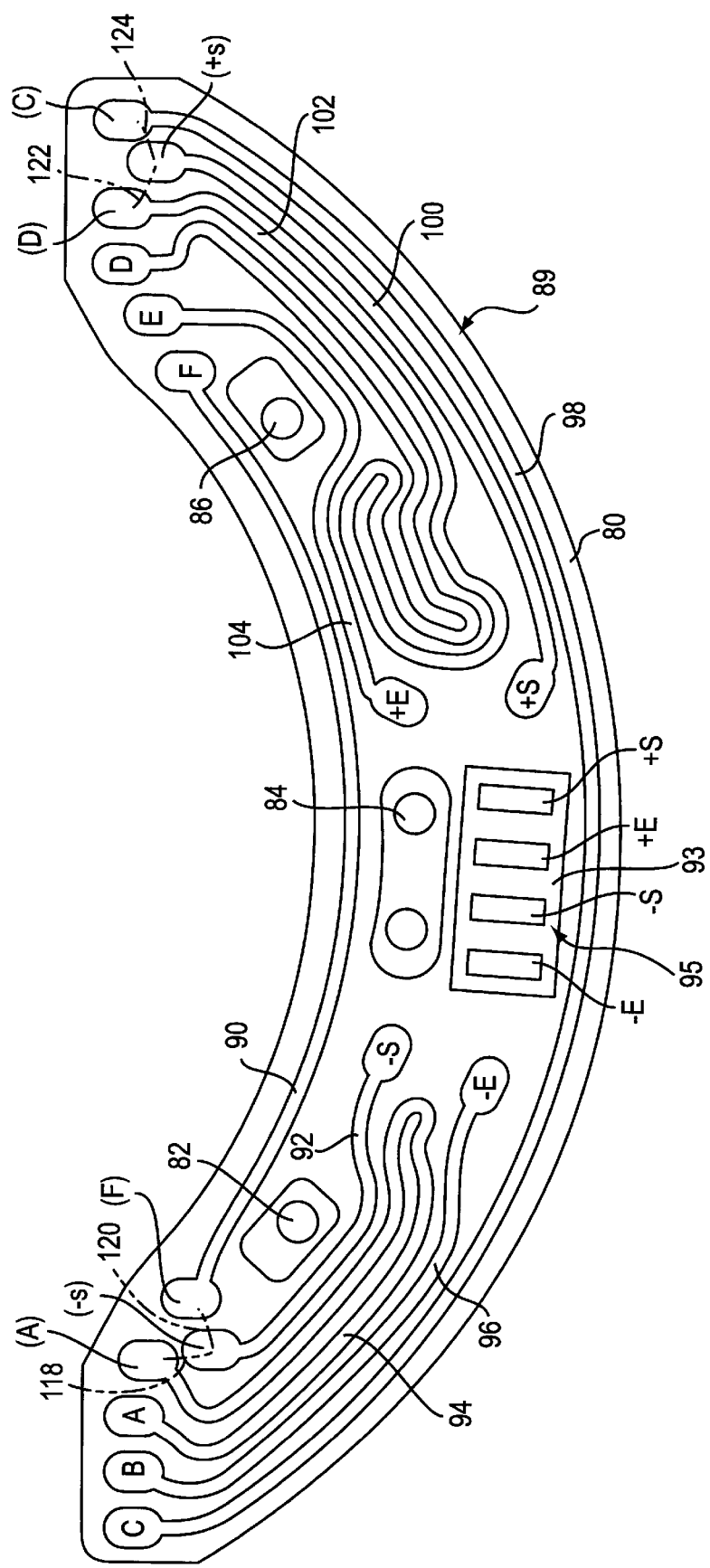
FIG. 7 illustrates a circuit board used in the hub load sensor.

Additionally, the gauge ring 18 has three mounting holes 68,70,72, best shown in FIGS. 2–4, configured to receive mounting pins 74,78,76, respectively, shown in FIG. 1. The mounting pins 74,76,78 are preferably made of copper. Retaining holes 82,84,86 corresponding to the mounting holes 68,70,72 are formed in a circuit board 80 of the strain gauge assembly 20 which is best shown in FIG. 7. The mounting pins 74,76,78 are inserted through the retaining holes 82,84,86, soldered to the circuit board 80, and then inserted into the mounting holes 68,70,72. The mounting pins 74,76,78 are secured in the gauge ring 18 by a bonding material 88, thus mounting the circuit board 80 to the gauge ring 18. The bonding material 88 is preferably solder, epoxy glue, or other similar bonding substance.

Printed circuitry 89, best shown in FIG. 7, is printed on the face of the circuit board 80. The printed circuitry 89 is preferably made of copper. Also, the circuit board has a terminal block 93 on which four terminals 95 are located. The technology used to produce circuit board 80 is well known in the art.

The strain gauge circuitry assembly 20 comprises the circuit board 80, the two strain gauges 106,110 oriented in the load measuring direction, the two axially oriented strain gauges 108,112, and a cable assembly 116. One load oriented strain gauge 106 and one axially oriented strain gauge 108 are fastened to the strain gauge mounting surface 52. The other load oriented strain gauge 110 and the other axially oriented strain gauge 112 are fastened to the strain gauge mounting surface 54. These strain gauges are commercially available and well known in the art. It is preferred that the strain gauges mounted to each surface 52,54 are disposed on the same matrix backing material 105. The strain gauges 106,108,110,112 are fastened by applying an adhesive to the matrix backing materials 105 and adhering them to associated surfaces 52,54. Strain gauge adhesives are well known in the art and commercially available.

Although it is possible to measure the load in the using only the load oriented strain gauges 106,110 it is preferred to use both the load oriented strain gauges 106,110 and the axially oriented strain gauges 108,112. The axially oriented strain gauges 108,112 reduce errors due to the shift of the load in an axial direction with respect to the cylindrical exterior surface 19 of the gauge ring 18, misalignment of the matrix backing materials 105, and the thermal behavior of the hub load sensor 10 including all structural steel parts and all components of the strain gauge circuitry assembly 20.

Figure 8:
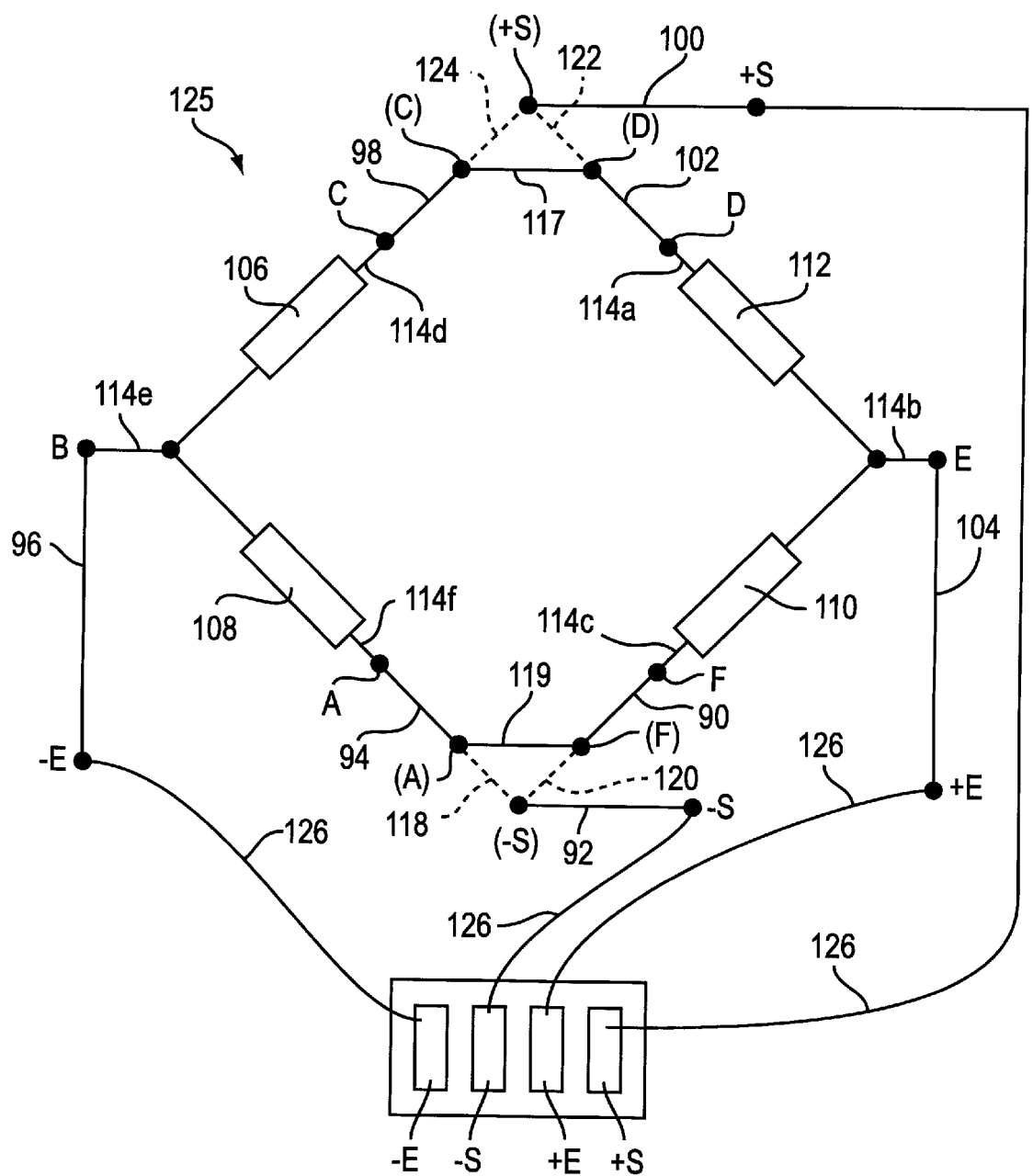
FIG. 8 illustrates a schematic diagram of the circuitry of the circuit board and a pair of strain gauges.

The plurality of connecting wires 114 connect the strain gauges 106,108,110,112 to the circuitry 89 on the circuit board 80. FIG. 8 is a schematic diagram illustrating these connections and the reference numerals in the strain gauge circuitry assembly 20 correspond to the same reference numerals in FIG. 8. The schematic diagram of FIG. 8 depicts what is known in the art as a Wheatstone bridge circuit 125. The circuit board 80 and printed circuitry 89 is not essential to the present invention, but they are preferred over more complex and space consuming wiring.

Referring more particularly to FIGS. 1, 7, and 8 connecting wire 114a connects axially oriented strain gauge 112 to node D of the printed circuitry 89. Connecting wire 114b connects the load oriented strain gauge 110 and the axially oriented strain gauge 112 to node E on the printed circuitry 89. Node F is connected to the load oriented strain gauge 110 by connecting wire 114c. The load oriented strain gauge 106 is connected to node C by connecting wire 114d and to node B by connecting wire 114e. Connecting wire 114e also connects the axially oriented strain gauge 108 to node B. The axially oriented strain gauge 108 is connected to node A by connecting wire 114f.

Printed circuit 90 connects node F to node (F) and printed circuit 94 connects node A to node (A). Both printed circuit 90 and printed circuit 94 have the same length to ensure that they have the same resistance. Nodes C and (C) are connected by printed circuit 98. Printed circuit 102 connects node (D) to node D and has the same length as printed circuit 98 such that each printed circuit 98,102 has the same resistance.

Node (−S) can be connected either to node (A) or to node (F) with a solder jumper bridge 118 and 120 respectively. Similarly node (+S) can be connected either to node (C) or to node (D) with a solder jumper bridge 124 and 122 respectively. Only one of the jumper bridges 118, 120 and one of the jumper bridges 122, 124 are activated during the final circuitry calibration. Printed circuit 92 connects node (−S) with node −S and printed circuit 100 connects node (+S) with node +S. Node E is connected to node +E by printed circuit 104 and node B is connected to node −E by printed circuit 96.

Thin jumper wires 126 are soldered to terminals 95 and the aforementioned nodes. Specifically, a thin jumper wire 126 connects terminal −E to node −E. Terminal −S is connected to node −S by a thin jumper wire 126. Node +E is connected to terminal +E by a thin jumper wire 126. Another thin jumper wire 126 connects terminal +S to node +S. The thin jumper wires 126 are designed to easily break off of the terminals 95 and the circuit board 80 if the cable assembly 116 and the terminal block 93 are ripped off of the circuit board 80 by accident, thereby preventing damage to the circuit board 80 and the strain gauges 106,108,110,112.

Figure 5:
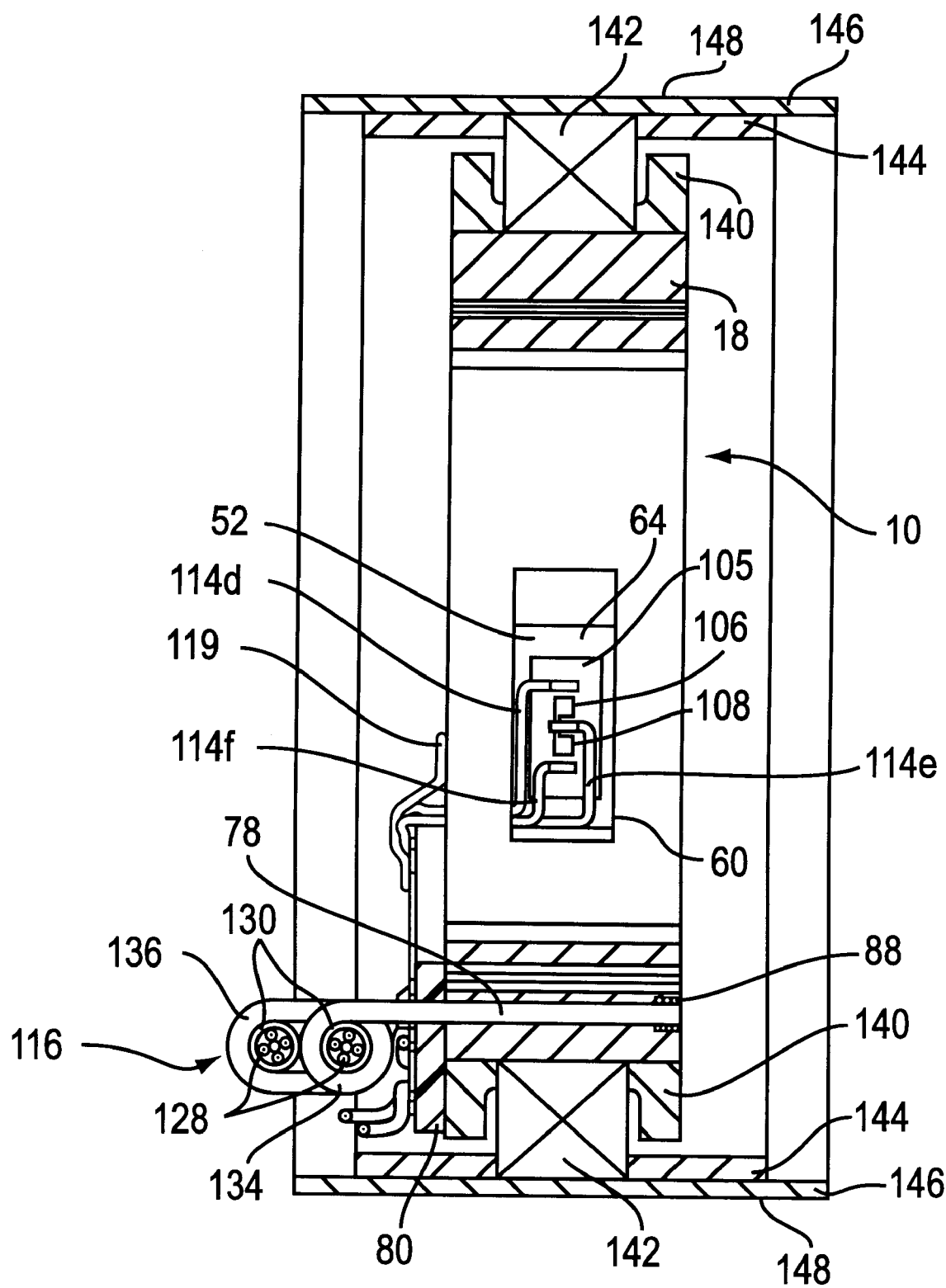
FIG. 5 is a sectional view of the idler pulley assembly along line 5—5 of FIG. 1.
Figure 6:
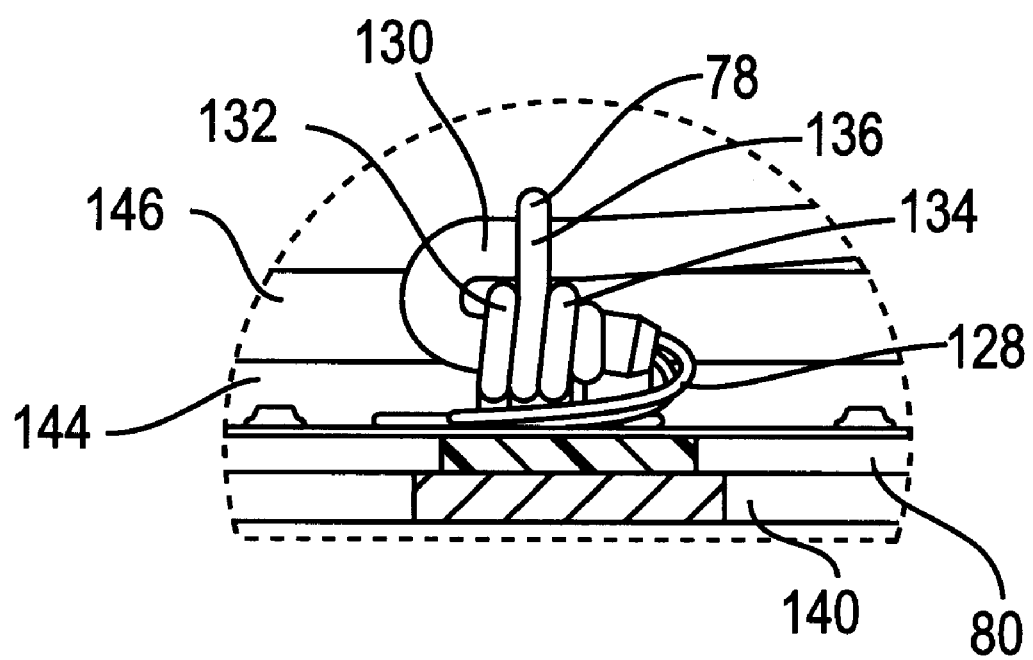
FIG. 6 is a partial sectional view of the idler pulley assembly along line 6—6 of FIG. 1.

Lead wires 128 are soldered to the terminals 95 and extend through the cable assembly 116 to an output device (not shown) and an input device (not shown). The cable assembly 116 comprises a shrink tube 130 and the previously described mounting pin 78. The mounting pin 78 extends outwardly from the circuit board 80 and transitions into a plurality of loops, including two in-line loops 132,134 and one offset loop 136, as best seen in FIG. 6. The preferred triple loop design of the long pin with two sections of the pin will allow a secure but gentle mounting of the cable 116 in either direction. This strong but gentle fixing of the cable is especially important in measurement applications where the gauge/pulley/sprocket assembly is installed onto a moving engine component, such as a belt/chain tensioner arm. The lead wires 128 pass through the shrink tube 130 in a braided arrangement 138 as best seen in FIGS. 1 and 5. The shrink tube 130, with the lead wires 128 therein, is inserted through the two in-line loops 132,134, folded back upon itself, and inserted through the offset loop 136 as seen in FIG. 6.

The input device is connected to the lead wires 128 that are connected to terminals +E and −E and transmits a constant voltage input to the strain gauge circuitry assembly 20. Although, it is also known in the art to use a constant current input rather than a constant voltage input, it is preferable to use a constant voltage input. The output device is connected to the lead wires 128 that are connected to terminal +S and −S. The output device is a voltmeter for reading an output voltage across terminals +S and −S. Because the changes in the output voltage may be small, an amplifier is usually used in conjunction with the voltmeter.

As conditions remain constant, the resistance of the strain gauge circuitry assembly 20 remains constant and, accordingly, the output voltage across terminals −S and +S remains constant. As discussed above, when a force is applied to the hub load sensor 10, the outer gauge ring portion 58 moves in the load measuring direction relative to the inner gauge ring portion 56, thereby stretching and creating strain in the strainable members 48,50 in the load measuring direction. The strain gauges 106,108,110,112 mounted on the surfaces 52,54 of the strain members 48,50 are therefore also stretched and their resistances change accordingly. These changes in resistance results in a change in the output voltage across terminals +S and −S which is transmitted to the output device.

Thus, it can be seen that the change in voltage across terminals −S and +S is directly related to the change in the strain in the strainable beam members 48,50. As discussed above, the strain in the strainable beam members 48,50 is a direct result of a force applied to the hub load sensor 10. Accordingly, by properly calibrating the output device and the strain gauge circuitry assembly 20 under controlled conditions with known forces applied to the hub load sensor 10, a force (such as a belt load force) applied to the hub load sensor 10 can be determined as a function of the change in output voltage across terminals −S and +S.

As best seen in FIGS. 1 and 8, a thermal compensation wire 117 connects node (C) to node (D). The use of a thermal compensation wire 117 in a Wheatstone bridge circuit 125 is well known in the art. The thermal compensation wire 117 is preferably made of copper and minimizes the change in resistance of the other wires in the strain gauge circuitry 20 due to temperature changes. A bridge balance wire 119 connects node (A) to node (F). The use of a bridge balance wire 119 in the Wheatstone bridge circuit 125 is also well known in the art. Preferably, the bridge balance wire 119 is made of manganin. The bridge balance wire 119 balances out inequalities in the Wheatstone bridge circuit 125 due to differences in length in the other wires in the strain gauge circuitry 20.

As shown in FIG. 1, the hub load sensor 10 can be used in the idler pulley assembly 14 to measure the tension in the belt 16. The hub load sensor 10 is fixedly mounted on the non-rotatable shaft 12 as shown in FIG. 1. As best shown in FIG. 5, inner lock rings 140 are press-fit around the hub load sensor 10 on the outer surface 19 of the gauge ring 18. One or more low profile ball bearing assemblies 142 shown in FIG. 5 are disposed between the inner lock rings 140 and fit on to the exterior surface 19 of the gauge ring 18. Two outer lock rings 144 are snugly fitted inside a pulley member 146 which is adhered to the outer race of the ball bearing assembly 142 such that the ball bearing assembly 142 is disposed between the two outer lock rings. The belt 16 engages with the outer surface 148 of the pulley member 146 as shown in FIG. 1.

The use of the lock rings has four advantages:
1) ball bearing slide/light press fit will not adversely affect bearing radial clearances even in elevated temperatures,
2) ball bearing slide/light press fit will not adversely affect gauge readings even in elevated temperature,
3) two gauge lock rings can be made in diametrically matching pairs to guarantee an even press fit loading on the gauge ring, and
4) gauge lock rings protect ball bearing seals and also give wider mounting support surface for the printed circuit board.

Tension in the belt 16 results in a force in the load measuring direction V on the pulley assembly. This vertical force is transmitted through the pulley member 146 to the ball bearing 142 and to the gauge ring 18. As discussed above, forces applied to the gauge ring 18 result in strain in the strainable beam members 48,50 which in turn causes a change in the output voltage across terminals −S and +S directly related to the magnitude of the strain. By previously calibrating the output device and the strain gauge circuitry assembly 20, the belt tension can be measured as a function of the change in the output voltage across terminals −S and +S (and hence strain magnitude) that results from the force applied to the gauge ring 18 in the load measuring direction by the belt 16.

A computing device (not shown) in the form of a microprocessor or a similar device may be connected to the strain gauge circuitry 20. The computing device can be adapted to calculate the force magnitude as a function of the measured strain magnitude.

Figure 14:
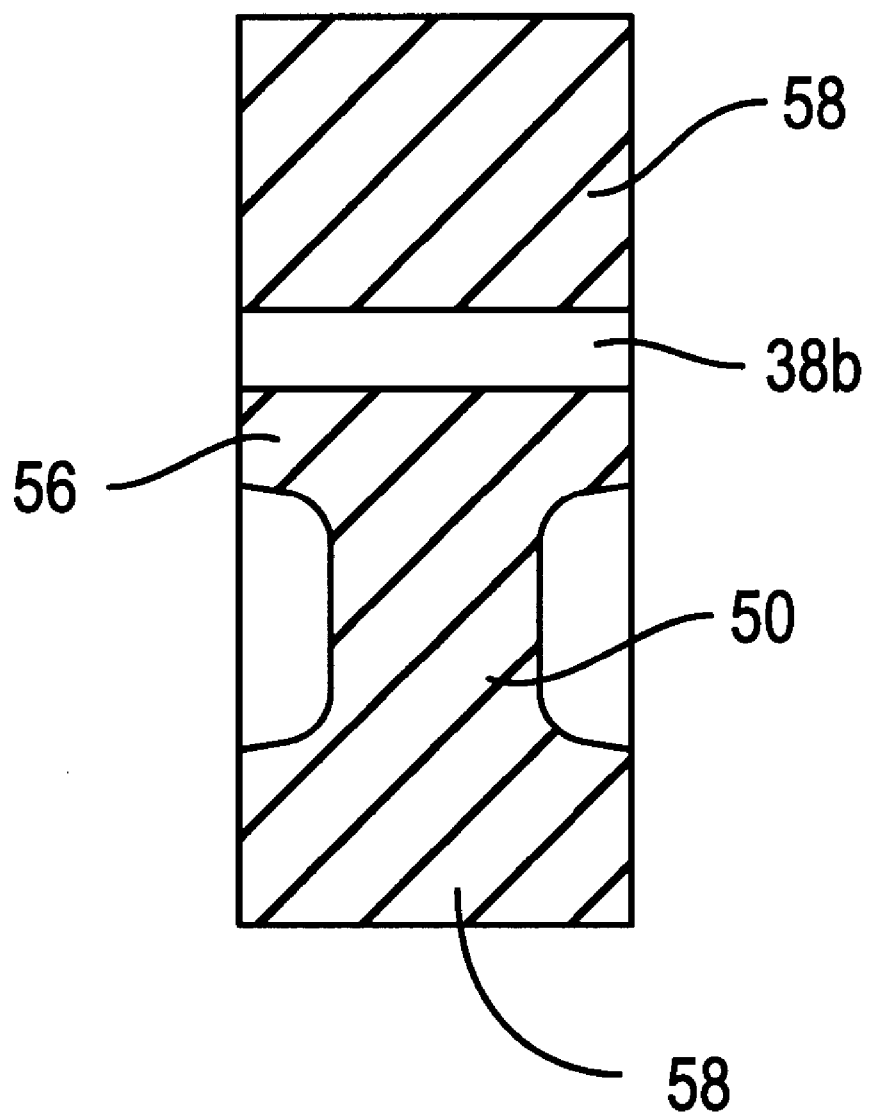
FIG. 14 is a sectional view along line 14—14 of FIG. 10.

It is to be understood that the hub load sensor 10 is not be limited to the use of measuring belt tension in an idler pulley assembly 14 and that other uses of the hub load sensor 10 of the present invention are contemplated. For example, utilizing the same principles, the hub load sensor 10 could be used to measure the tension in a chain in a chain and sprocket assembly simply by substituting a sprocket for the pulley member 146 and the chain for the belt 16. Similarly the hub load sensor 10 can be used to measure tension in any non-load-transmitting continuously running element passing over a rotary element which is adapted to receive the hub load sensor 10. Such running elements may include paper web, thin wires or textile threads. It is generally possible to make both the force bearing strain members 48,50 and the upper and lower flexing members 40*a*, 40*b* and 46*a*, 46*b* thin enough to keep the sensitivity of the unit high enough. However, in case of very low hub loads it may be desirable to reduce the width of the above mentioned elements (40*a*, 40*b*, and 46*a*, 46*b*) by removing some material from their outer edges can be appreciated from the cross-sectional view of FIG. 14, taken through the line 14—14 in FIG. 10. Also, FIGS. 9 and 10, for example, illustrate the hub load sensor 10 being used to measure the coefficient of friction between a bushing 150 and an oscillating shaft 152.

The oscillating shaft 152 is driven by an oscillating motor 154. The bushing 150 fits around the oscillating shaft 152 and is prevented from rotating with the shaft 152 by being press-fit to a non-rotatable bushing support 156 disposed around the bushing 150. The cylindrical inner surface 24 of the gauge ring 18 fits in fixed relation on the bushing support 156 to mount the hub load sensor 10 on the bushing support. The hub load sensor 10 is mounted in non-rotatable relation relative to bushing support 156 as a result of cylindrical nodes 158 engaging the semi-circular concave grooves 26 in the gauge ring 18 and semi-circular concave grooves 159 on the bushing support 156. The bushing 150 does not rotate in relation to the bushing support 156 or the hub load sensor 10. The hub load sensor 10, the bushing support 156, and the bushing 150 are supported by a sensor stand 160 with the hub load sensor 10 held in a sensor mounting block 161. The sensor mounting block 161 is connected to the sensor stand 160 via sliding mechanism 175 which allows the sensor mounting block to move in the direction of load L. The oscillating shaft 152 is rotatably supported by shaft stands 162.

Figure 9:
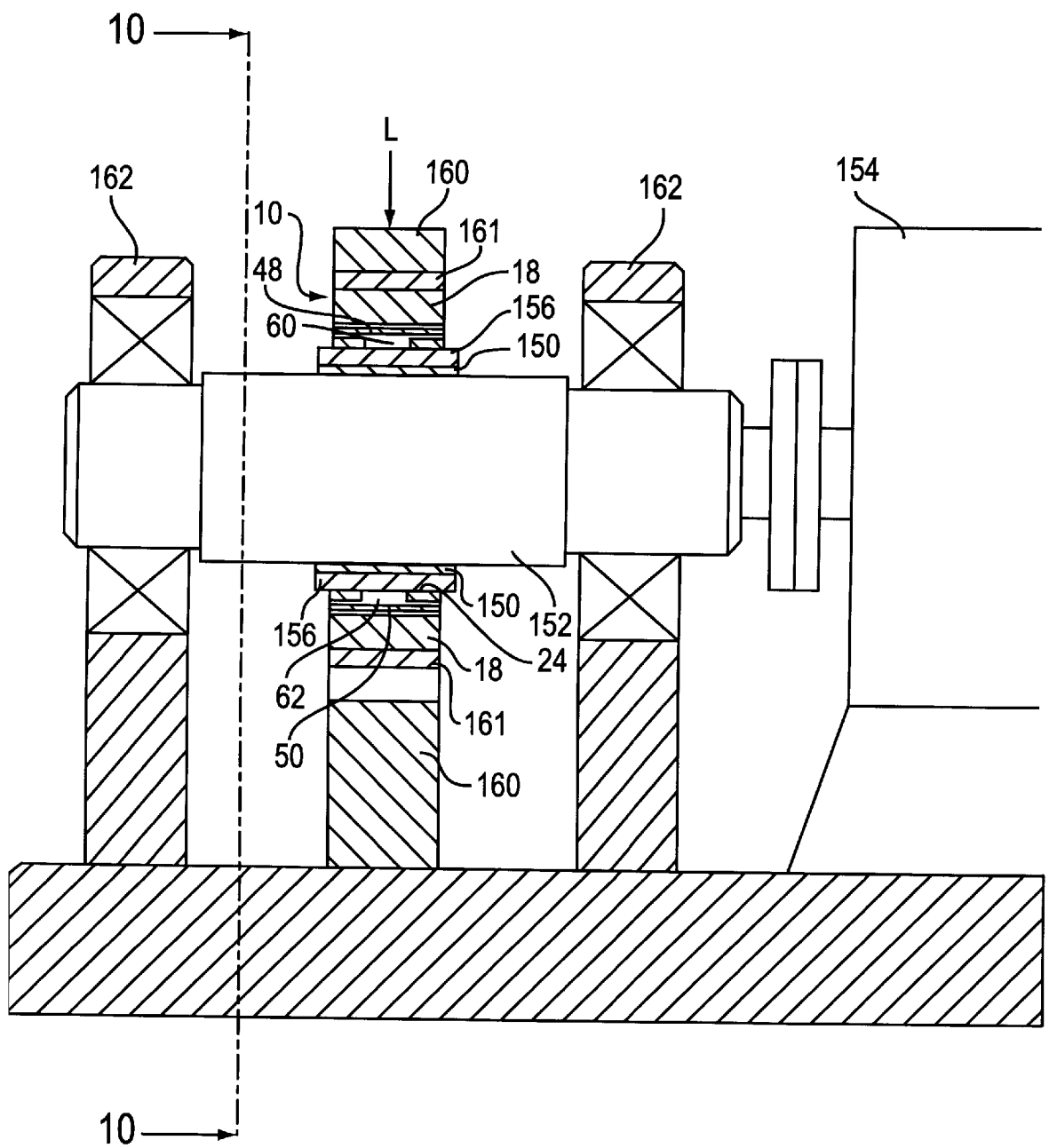
FIG. 9 is a sectional view of the hub load sensor being utilized to measure the frictional forces between a bushing and an oscillating shaft.
Figure 10:
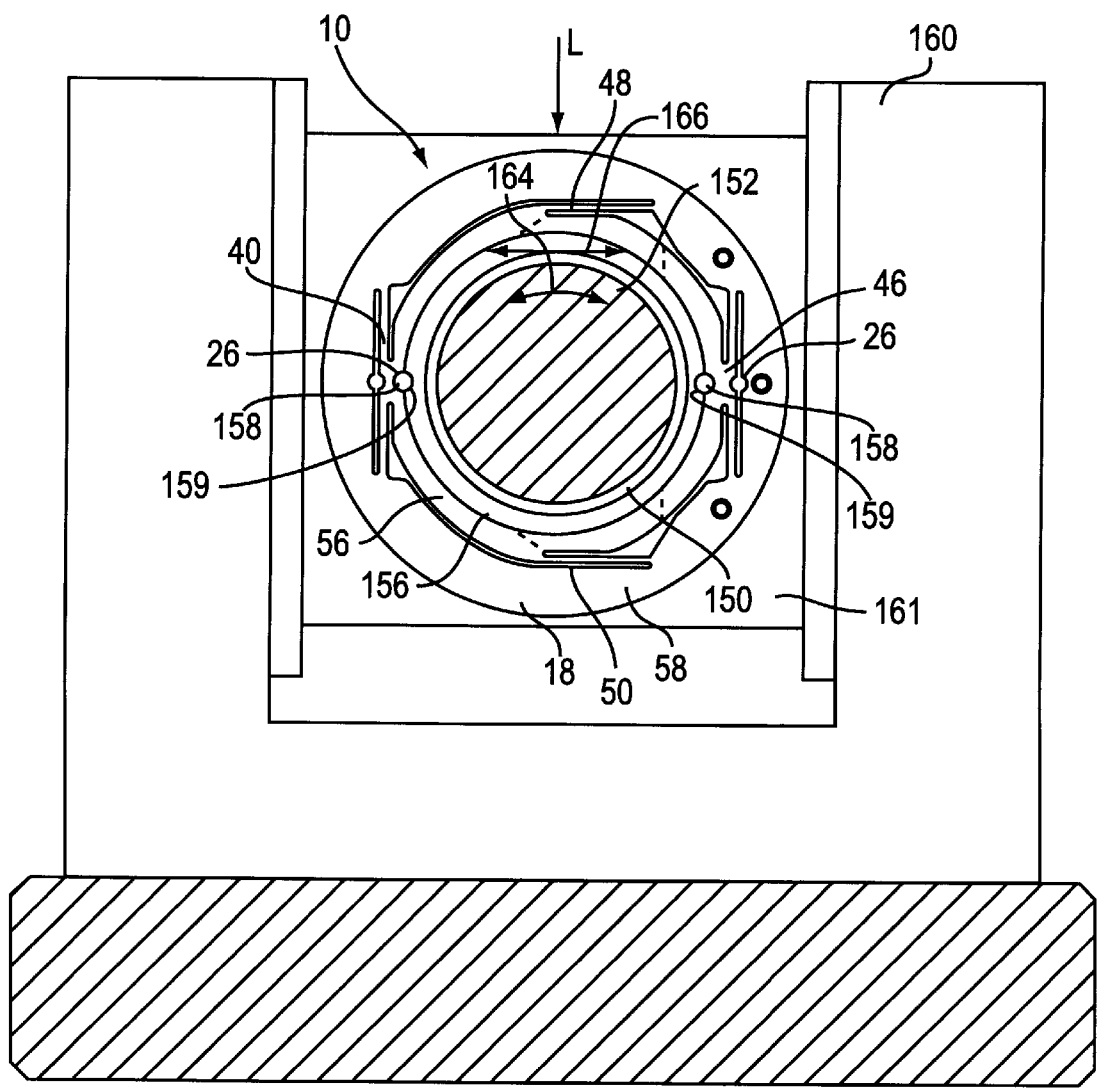
FIG. 10 is a sectional view along line 10—10 of FIG. 9.

In this friction-detecting arrangement, the load sensor 10 is rotated by 90 degrees in comparison with the environment in FIG. 1. As a result, when a vertical force is applied in direction L, as shown in FIGS. 9 and 10, the force is transmitted to the inner ring portion 56 without a significant amount of strain being seen by the strainable members 48,50 due the stiffness of the flexing beam members 40*a*, 40*b*,46*a*, 46*b* due to the fact that the hub load sensor 10 and its mounting block 161 can slide vertically downwards. The force in the direction L causes friction between the bushing 150 and the oscillating shaft 152 as the shaft 152 oscillates as indicated by arrow 164 in FIG. 10. The friction between the bushing and the shaft is seen as a force component (see arrow 166) tangential to the oscillating shaft 152 in the load measuring direction of the gauge ring 18. The friction force is transmitted through the bushing support 156 to the load sensor 10, thereby applying forces in the load measuring direction to the inner gauge ring portion 56 of the load sensor 10. The directions of the friction force at the interface of the bushing support and the gauge ring 18 is indicated by arrows 166 in FIG. 10.

The forces in the load measuring direction on the inner gauge ring portion 56 cause the inner gauge ring portion 56 to move with relative to the outer gauge ring portion 58. Similar to the movements described with regard to the environment depicted in FIG. 1, the movement of the inner gauge ring portion 56 relative to the outer gauge ring portion 58 is substantially isolated to the load measuring direction by the flexing beam members 40*a*,40*b*,46*a*,46*b* and the strain members 48,50 are stretched and compressed as the shaft 152 oscillates back and forth and applies force to the inner gauge ring portion 56. This stretching and compressing is seen as a strain by the strain gauges 106,108,110,112 and is directly related to the change in the output voltage across terminals −S and +S which is transmitted to the output device. Because the strain in the strain members 48,50 is directly related to the friction between the oscillating shaft 152 and the bushing 150, the friction can be determined as a function of the change in the output voltage across the terminals −S and +S. Furthermore, the coefficient of friction between the bushing 150 and the oscillating shaft 152 can be determined as a function of the force applied in the direction L and the friction between the bushing 150 and the oscillating shaft 152 as measured by the change in voltage.

Figure 11:
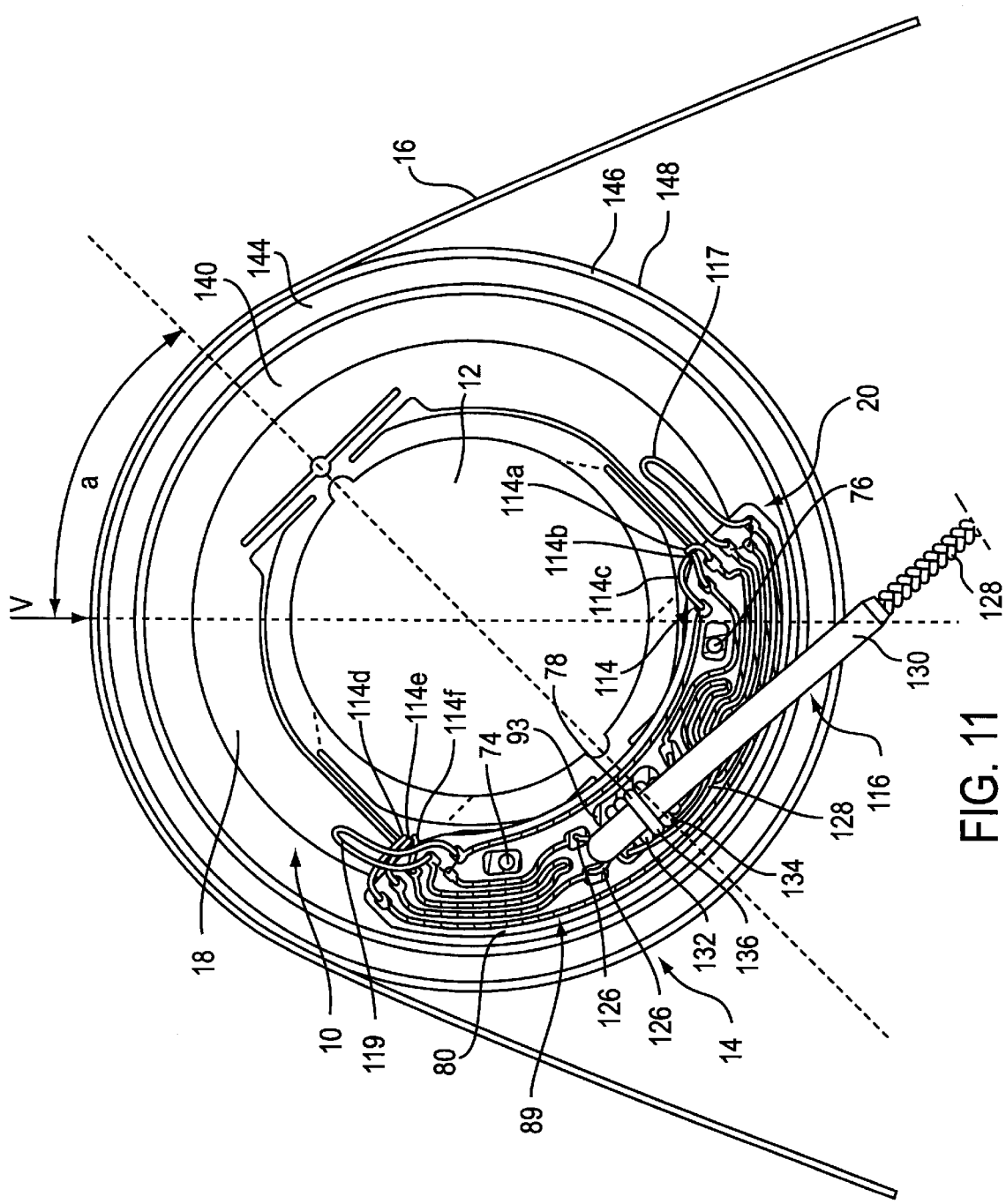
FIG. 11 illustrates the hub load sensor being utilized at an angle in an idler pulley assembly to measure belt tension.

The present invention is not limited to measuring loads or friction in the transverse or load measuring direction with respect to the hub load sensor 10. A load on the load sensor 10 at an angle $\alpha$ to the load measuring direction is shown in FIG. 11. This load has a force component in the load measuring direction having a magnitude approximately equal to the load multiplied by $\cos\alpha$. Thus, load on the hub load sensor 10 at a given angle $\alpha$ can be determined by dividing the load measured in the load measuring direction by the hub load sensor 10 by $\cos\alpha$.

Furthermore, the load sensor 10 is not limited to measuring loads in a stationary manner. It is contemplated that the hub load sensor 10 can be mounted on rotating members in addition to the previously discussed stationary members. For example, FIGS. 12 and 13 illustrate the hub load sensor 10 being utilized in a torque transmitting pulley assembly 168 to measure tension in a belt 170 operatively associated with the torque transmitting or driven pulley assembly 168.

Figure 12:
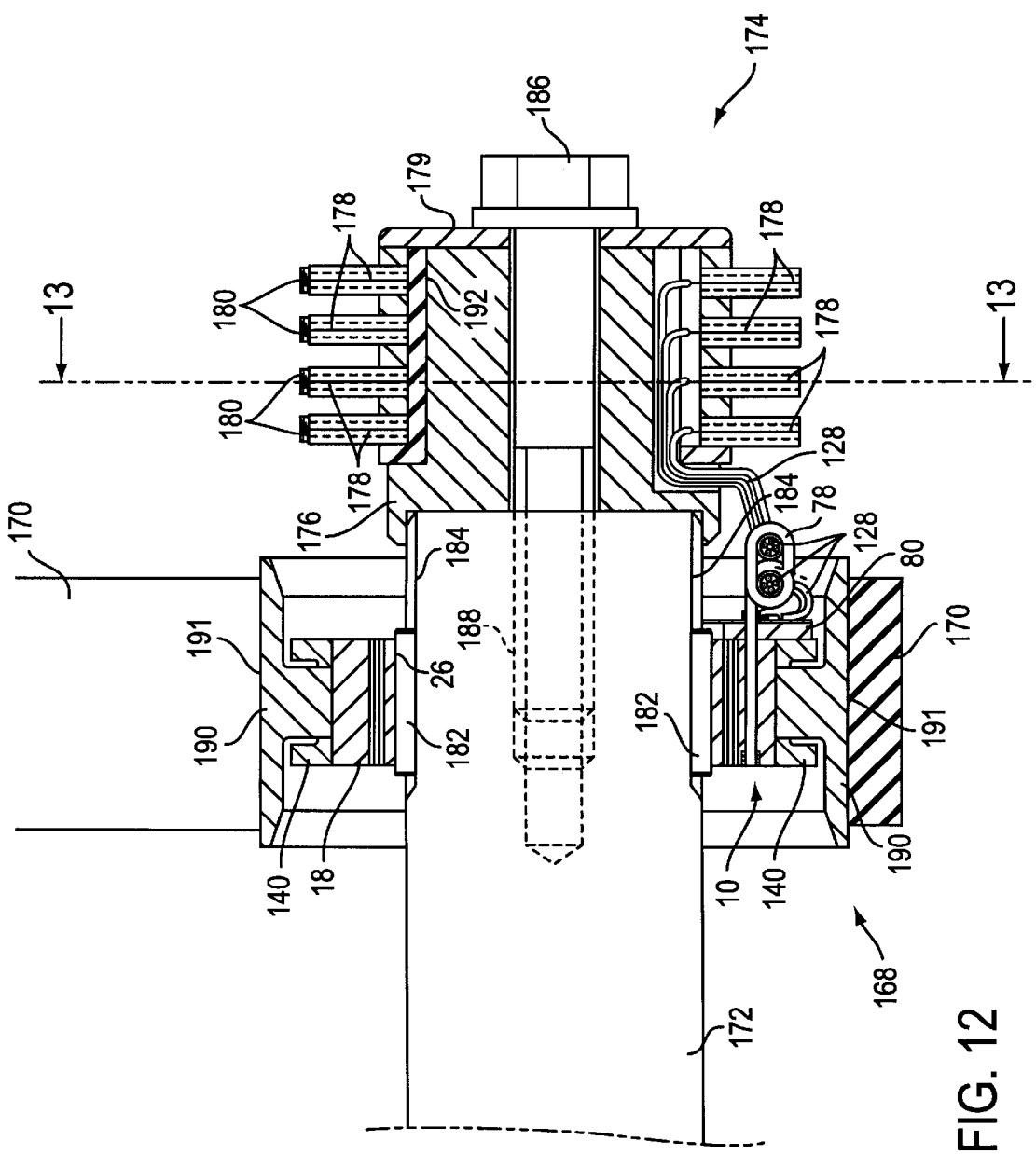
FIG. 12 is a sectional view of the hub load sensor being utilized with a slip ring device in a torque transmitting pulley assembly to measure belt tension.
Figure 13:
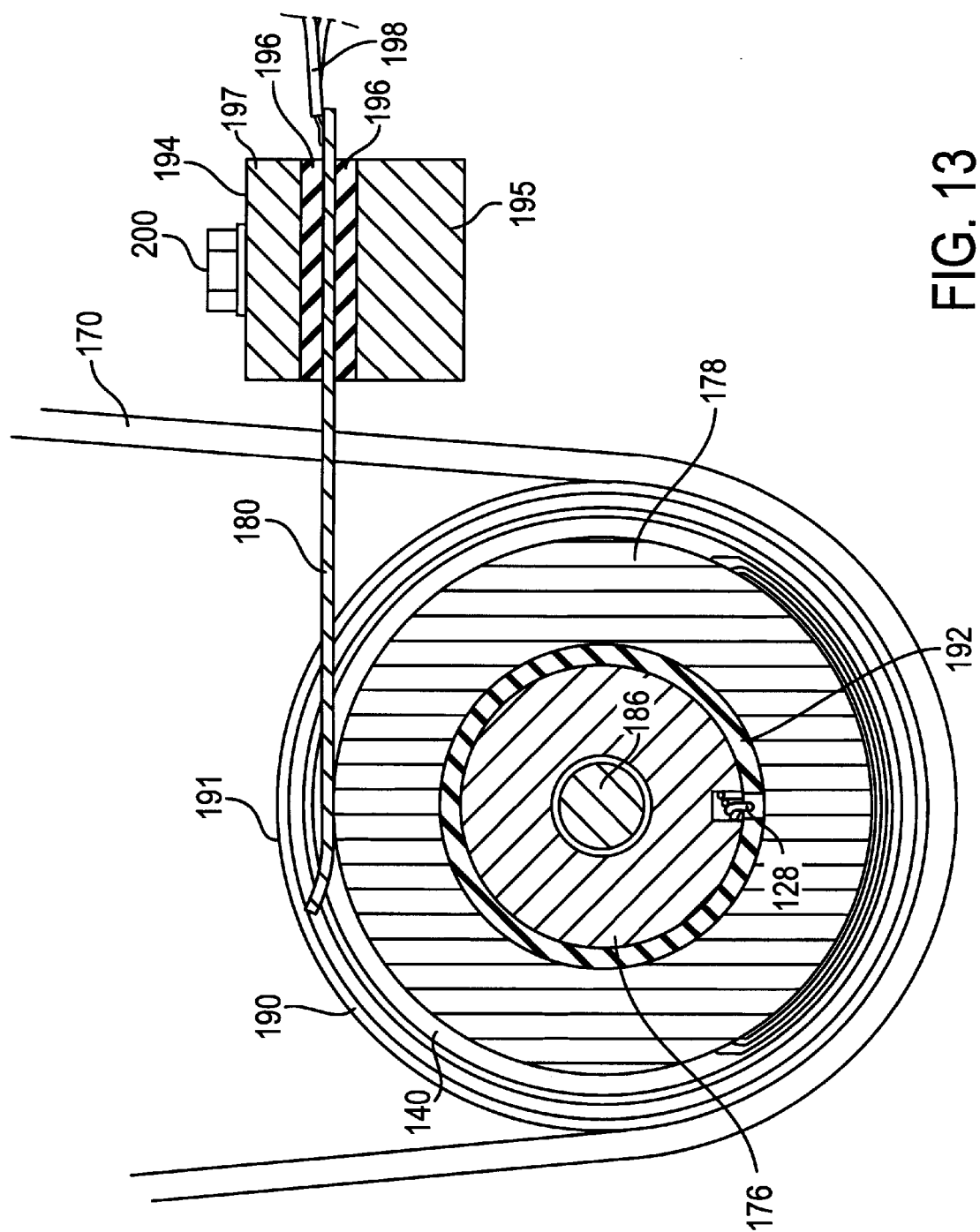
FIG. 13 is a sectional view along line 13—13 of FIG. 12.

FIG. 12 is a sectional view of the hub load sensor 10 being utilized in the torque transmitting pulley assembly 168. The hub load sensor 10 is fixed to the torque transmitting shaft 172 so that it rotates with the shaft 172. The semi-circular grooves 26 on the gauge ring 18 and semi-circular grooves 184 on the shaft 172 engage circular rods 182. Inner lock rings 140 discussed above are press-fit over the hub load sensor 10. A pulley member 190 fits tightly over the inner lock rings 140 and has a portion extending radially inwardly which fits between the inner lock rings 140 and contacts the exterior cylindrical surface 19 of the gauge ring 18. The outer surface 191 of the pulley member 190 is engaged with the belt 170. A slip ring device 174 operatively connects the lead wires 128 to the input device (not shown) and the output device (not shown). Slip ring devices are well known in the art for allowing an electric signal to be transmitted from a moving part to a stationary part and vice versa.

The slip ring device 174 comprises a slip ring mounting assembly 176 with a plurality of slip ring disks 178 and stationary slip ring shoe conductors 180. The slip ring mounting assembly 176 is mounted to the shaft 172 by a bolt 186 inserted into a bore 188 in the shaft 172. Four slip ring discs 178 are disposed around the slip ring mounting assembly 176 and secured thereon by a slip ring cap 179. The slip ring disks 178 are insulated from the bolt 186 and from each other by a layer of insulation sleeve 192 and insulation discs 193. The lead wires 128 are each connected to corresponding slip ring disks 178.

These slip ring disks 178 rotate with the shaft 172 and the hub load sensor 10 and maintain constant contact with the stationary slip ring shoe conductors 180. The slip ring shoe conductors 180 are held stationary by a shoe conductor retainer 194. The shoe conductor retainer 194 comprises two members 195,197 which hold the shoe conductors 180 stationary between two layers of electric insulating material 196. The two members 195,197 are held together by a bolt 200.

The slip ring shoe conductors 180 transmit signals through wires 198 from the input device to the corresponding terminals 95 and from the corresponding terminals 95 to the output device. Thus, the strain gauge circuitry 20 of the hub load sensor 10 is operatively connected to the input and output devices and allowed to rotate with the torque transmitting pulley assembly 168. Accordingly, the tension in the belt 170 can be determined while the torque transmitting pulley assembly 168 is rotating. Using the cosine relation discussed above, the tension in the belt 170 can be determined at any given time when the angle with respect to the load measuring direction at which the hub load sensor 10 is rotated is known. Voltage input and output transmitting devices other than the slip ring device 174, such as a device that transmits signals by telemetry, may be used to transmit input and output signals from the rotating hub load sensor 10 for stationary input and output devices.

Figure 15:
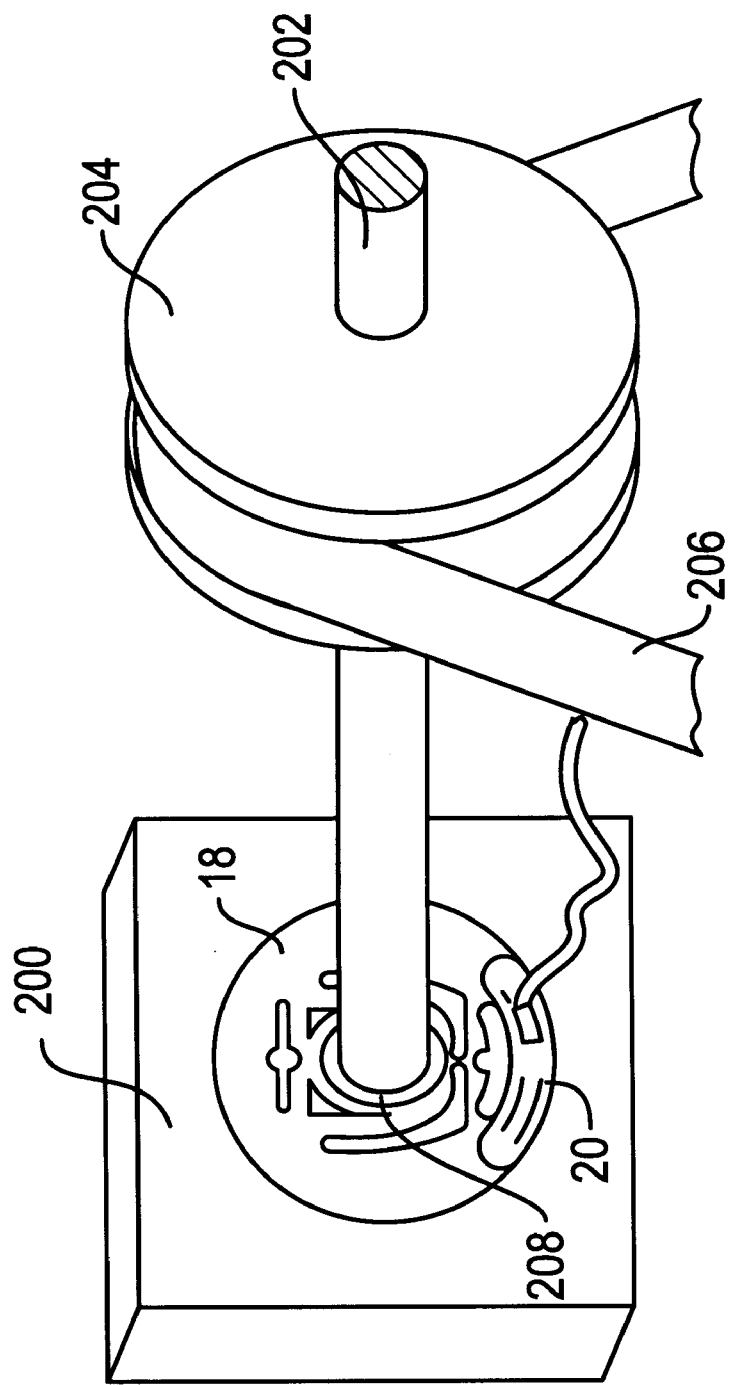
FIG. 15 shows an alternative pulley assembly arrangement with the gauge ring spaced axially from the pulley member.

FIG. 15 shows an alternative pulley assembly arrangement for measuring belt tension. The gauge ring 18 is fixedly mounted in a housing 200. The shaft 202 may be rotatably mounted or fixedly mounted. The shaft 202 in FIG. 15 is rotatably mounted and the pulley member 204 is mounted directly to the shaft 202 with no ball bearing assembly therebetween. In a fixed shaft arrangement, the pulley member 16 would be mounted on a ball bearing assembly. As before, a belt 206 is engaged with the pulley member 204. A ball bearing assembly 208 fits within the gauge ring 18 and the shaft 202 is mounted inside the ball bearing assembly 208 for rotational movement. A load applied by the belt 206 deflects the shaft 202 and causes the inner ring portion of the gauge ring to move relative to the outer ring portion in the manner described above with respect to the other embodiments, thereby providing a load measurement.

In summary, to measure hub load as close to the belt/pulley interface possible, the load sensing strain gauge in the gauge ring is separated from the belt only by the low profile ball bearing and the pulley ring mounted over this ball bearing. Due to the close proximity of the belt/pulley interface and the load measuring strain gauges, even a slight variation in the belt tension is immediately sensed by the strain gauges. Thus, dynamic hub load is accurately measured continuously.

Because of the long, relatively thin strain gauged load bearing sections of the gauge ring, the offset of the hub load does not affect the readings of the gauges located at the centerline of the device. Thus, the device is insensitive to belt mistracking.

Due to the fact that the load bearing (strain gauged) sections of the gauge ring are thin, the strain gauges are sensitive enough for highly accurate readings. However, since the structure is in tension, the stretch of the measuring sections—relative movement between inner and outer ring section—stays very short. Consequently, the moving mass (the outer ring section, low profile ball bearing and pulley ring) is also quite small resulting in the natural frequency of the device itself being high and well above operational frequencies of any standard belt drive system under measurement exercise. Thus, the device is sensitive, but rigid enough so that it does not change the natural frequencies of the drive system and does not allow its own inertia to affect the load readings.

Finally, due to the location of strain gauges inside the closed pockets of the gauge ring, it is virtually impossible to damage the gauges except by overheating and/or over loading the device. The over loading can further be prevented by the narrow gap between the inner and outer ring sections of the gauge ring, which closes under the overloading conditions removing the load carrying functions from the strain gauged sections. The reliability of the wiring, on the other hand, has been achieved by using the above-mentioned printed circuit board design.

It is to be understood that the foregoing embodiments are provided to illustrate the functional and structural principles of the present invention and are not intended to be limiting. Any modifications or alterations may be made to the above embodiments within the scope of the appended claims.

It should be noted that claim language in the "means or step for performing a specified function" format specified by 35 U.S.C. § 112, paragraph 6, has been omitted from the appended claims. This is to clearly point out that the claims are not intended to be interpreted under § 112, paragraph 6, so as to be limited solely to the structures disclosed and their equivalents.

What is claimed is:

1. A pulley assembly for measuring driving element tension in a system driven by a tensioned endless driving element, said pulley assembly comprising:

a rotatable pulley member having a driving element engaging outer surface engageable with the tensioned driving element such that the driving element applies a load to said pulley member directly related to the driving element tension, the load having a force component in a load measuring direction; and a load sensor comprising:

an annular gauge ring comprising an inner mounting portion constructed and arranged to enable said gauge ring to be mounted adjacent said endless driving element and an annular outer ring portion;

said gauge ring being positioned with respect to said pulley member such that the load applied to said pulley member causes relative movement between said mounting and ring portions;

said gauge ring having strainable beam members extending in said load measuring direction and flexing beam members extending in a transverse direction generally perpendicular to said load measuring direction, said strainable beam members and said flexing beam members interconnecting said inner mounting and outer ring portions;

said flexing beam members being thicker in comparison to said strainable beam members so that said flexing beam members are less subject to elongation and compression due to strain in comparison to said strainable beam members such that said flexing beam members substantially limit relative movement between said mounting and ring portions to said load measuring direction when the tensioned driving element applies the aforesaid load with the force component in said load measuring direction to said pulley member by (1) resisting elongation and compression to substantially prevent relative movement between said mounting and ring portions in said transverse direction and (2) flexing to allow limited relative movement between said mounting and ring portions in said load measuring direction;

said strainable beam members being constructed and arranged such that the substantially limited relative movement between said mounting and ring portions creates a strain in said load measuring direction in said strainable beam members having a magnitude directly related to a magnitude of the force component in said load measuring direction;

a strain measuring and outputting device operatively associated with said strainable beam members, said strain measuring and outputting device being adapted to measure the magnitude of the strain created in said strainable beam members and to thereafter output the measured strain magnitude as an output signal which can be used to calculate magnitude of the aforesaid force component and hence the driving element tension.

2. The pulley assembly of claim 1, further comprising a computing device operatively connected to said measuring and outputting device, said computing device being adapted to calculate the force component magnitude and hence the driving element tension as a function of the measured strain magnitude.

3. The pulley assembly of claim 1, wherein said gauge ring has a first pair of arcuate cavities arranged symmetrically with respect to said load measuring direction and a second pair of arcuate cavities arranged symmetrically with respect to said load measuring direction;

said arcuate cavities extending axially through said gauge ring and cooperating to define said inner mounting portion and said outer ring portion.

4. The pulley assembly of claim 3, wherein each of said first and second arcuate cavities has an arcuate portion and a substantially straight portion extending in said load measuring direction, the substantially straight portion of each of said first arcuate cavities being arranged adjacent and generally parallel to the substantially straight portion of an associated one of said second arcuate cavities so as to define said strainable beam members therebetween.

5. The pulley assembly of claim 4, wherein said gauge further comprises a pair of substantially straight cavities arranged generally symmetrically with respect to and extending generally in said transverse direction;

each of said first and second arcuate cavities having another substantially straight portion extending generally in said transverse direction;

the another substantially straight portion of each of said first arcuate cavities being arranged adjacent and generally parallel to one of said substantially straight cavities so as to define one of said flexing beam members therebetween;

the another substantially straight portion of each of said second arcuate cavities being arranged adjacent and generally parallel to the other of said substantially straight cavities so as to define the other of said flexing beam members therebetween.

6. The pulley assembly of claim 5, wherein said gauge ring is made of hardened steel.

7. The pulley assembly of claim 6, wherein said cavities are formed by wire EDM.

8. The pulley assembly of claim 5, wherein said strainable beam members each have interiorly facing strain gauge mounting surfaces extending generally in said load measuring direction;

said strain measuring and outputting device comprising strain gauges oriented in said load measuring direction adhered to said strain gauge mounting surfaces.

9. The pulley assembly of claim 8, wherein said strain measuring and outputting device further comprises strain gauges oriented in the axial direction adhered to said strain gauge mounting surfaces.

10. The pulley assembly of claim 8, wherein said strain measuring and outputting device comprises a printed circuit board connected to said strain gauges.

11. The pulley assembly of claim 9, wherein said strain measuring and outputting device comprises a voltage measuring device and a constant voltage supply and said printed circuit board has printed circuitry cooperating with said strain gauges to define a Wheatstone bridge circuit comprising:

a pair of input nodes connected to said constant voltage supply;

a pair of output nodes connected to said voltage measuring device, one of said output nodes being in series with the strain gauge of one of said strain gauge mounting surfaces and the other of said output nodes being in series with the strain gauge of the other of said strain gauge mounting surfaces;

said series being in parallel and connected to each of said input nodes;

said voltage measuring device measuring a voltage output across said output nodes which can be used to calculate the magnitude of the aforesaid force component of the applied load.

12. The pulley assembly of claim 1, wherein said inner mounting portion of said annular gauge ring has a mounting bore formed therethrough, said bore being configured to mount said gauge ring to a shaft by inserting said shaft into said mounting bore, said pulley member being rotatably mounted to an exterior surface of said gauge ring.

13. The pulley assembly of claim 12, wherein the surface defining said mounting bore and said shaft cooperate to prevent relative rotational movement between said shaft and said gauge ring.

14. The pulley assembly of claim 13, further comprising a rod, each of said shaft and the surface defining said mounting bore having a cooperating indentation, said rod being inserted between said shaft and the surface defining said mounting bore so as to be received in said indentations and prevent relative rotational movement between said shaft and said gauge ring.

15. The pulley assembly of claim 13, further comprising a ball bearing assembly, said ball bearing assembly being mounted on said exterior surface of said gauge ring and pulley member being mounted to said ball bearing assembly for rotational movement.

16. The pulley assembly of claim 1, wherein said shaft is rotatable, said inner mounting portion of said gauge ring having a mounting bore formed therethrough, said bore being configured to mount said gauge ring to a rotatable shaft by inserting said shaft into said mounting bore, said pulley member being fixedly mounted to an exterior cylindrical surface of said gauge ring such that said pulley member, said gauge ring, and said shaft rotate together.

17. The pulley assembly of claim 16, wherein the surface defining said mounting bore and said shaft cooperate to prevent relative rotational movement between said shaft and said gauge ring.

18. The pulley assembly of claim 17, further comprising a rod, each of said shaft and the surface defining said mounting bore having a cooperating indentation, said rod being inserted between said shaft and the surface defining said mounting bore so as to be received in said indentations and prevent relative rotational movement between said shaft and said gauge ring.

19. The pulley assembly of claim 16, wherein said shaft is connected to a rotary power source such that said pulley assembly is a torque transmitting pulley assembly.

20. The pulley assembly of claim 16, wherein said strainable beam members each have strain gauge mounting surfaces extending generally in said load measuring direction;

said strain measuring and outputting device comprising strain gauges oriented in said load measuring direction adhered to said strain gauge mounting surfaces and a printed circuit board connected to said strain gauges;

said strain measuring and outputting device further comprising a stationary voltage measuring device and a constant voltage supply;

said printed circuit board having printed circuitry cooperating with said strain gauges to define a Wheatstone bridge circuit comprising:

a pair of input nodes;

a pair of output nodes, one of said output nodes being in series with the strain gauge of one of said strain gauge mounting surfaces and the other of said output nodes being in series with the strain gauge of the other of said strain gauge mounting surfaces;

said series being in parallel and connected to each of said input nodes;

said strain measuring and outputting device further comprising a voltage input and output transmitter mounted for rotation along with said gauge ring;

said voltage input and output transmitter being connected to said input and output nodes and in continuous communication with both said stationary voltage measuring device and said constant voltage supply such that said input nodes are continuously connected to said constant voltage supply and said output nodes are continuously connected to said voltage measuring device, thereby enabling said voltage measuring device to measure a voltage output across said output nodes which can be used to calculate the aforesaid force component magnitude and hence the driving element tension.

21. The pulley assembly of claim 20, wherein said output transmitter is a plurality of slip ring discs mounted for rotational movement along with said gauge ring and wherein said stationary voltage measuring device includes a plurality of stationary slip ring conductors, said slip ring discs being connected to said input and output nodes and said conductors being continuously engaged with said discs during rotation thereof.

22. The pulley assembly of claim 1, wherein said inner mounting portion of said annular gauge ring has a mounting bore formed therethrough, said pulley member being mounted to said shaft, said bore being configured to mount said gauge ring to said shaft by inserting said shaft into said mounting bore in a spaced axial relation from said pulley member.

23. The pulley assembly of claim 22, wherein said shaft is rotatable and said assembly further comprises a ball bearing assembly mounted inside said mounting bore, said ball bearing assembly having a bore formed therethrough into which said shaft is received.

24. The pulley assembly of claim 23, further comprising a housing constructed and arranged to fixedly mount said gauge ring.

* * * * *